United States Patent [19]

Gémignani

[11] Patent Number: 4,515,344

[45] Date of Patent: May 7, 1985

[54] BLOCKING VALVE

[76] Inventor: François Gémignani, Zone Industrielle la Palunette, Bouches-du-Rhone, Chateauneuf les Martigues, France

[21] Appl. No.: 341,829

[22] Filed: Jan. 22, 1982

[30] Foreign Application Priority Data

Feb. 17, 1981 [FR] France ................................ 81 03481

[51] Int. Cl.³ .......................................... F16K 31/122
[52] U.S. Cl. ..................................... 251/635; 251/214; 251/284; 251/335 B
[58] Field of Search ............. 251/63.5, 335 R, 335 A, 251/335 B, 324, 284, 330, 214, 367; 277/22, 166

[56] References Cited

U.S. PATENT DOCUMENTS

| | | | |
|---|---|---|---|
| 2,060,498 | 11/1936 | Gobb | 277/22 |
| 3,194,502 | 7/1965 | West | 251/335 B |
| 3,269,698 | 8/1966 | Koch | 251/330 |
| 3,537,682 | 11/1970 | Priese | 251/214 |
| 3,563,508 | 2/1971 | Delorenzo | 251/63.5 |
| 3,831,900 | 8/1974 | Matousek et al. | 251/330 |
| 3,990,680 | 11/1976 | Massey, Jr. | 251/335 B |
| 4,285,498 | 8/1981 | Nightingale | 251/335 R |

FOREIGN PATENT DOCUMENTS 1023942  2/1958  Fed. Rep. of Germany ... 251/335 B

Primary Examiner—Martin P. Schwadron
Assistant Examiner—James R. Shay
Attorney, Agent, or Firm—Karl F. Ross; Herbert Dubno

[57] ABSTRACT

A blocking-type valve for isolating or closing a fluid path comprises a housing body forming a throughgoing fluid passage and, at an intermediate location along this passage, a valve seat inclined to the general direction in which the passage extends. A valve-closure member is axially shiftable into engagement with the seat and is provided on a sliding rod. The valve body also contains a tubular member or sleeve concentric with the end of the rod carrying the valve-closure member and of a length and cross section such that, in the open position of the valve, the interior of this sleeve is sealed off by the closure member.

6 Claims, 9 Drawing Figures

BLOCKING VALVE

FIELD OF THE INVENTION

My present invention relates to a blocking valve and, more particularly, to a valve for isolating a portion of a fluid path and/or stopping flow of a fluid along such a path, e.g. as a fluid controlling member or as a safety device in high pressure systems.

BACKGROUND OF THE INVENTION

Blocking valves, especially for industrial purposes where extremely reliable valve operations are required, generally comprise a valve body formed with a passage, a seat along this passage interconnecting opposite sides thereof, and a valve member which is engageable with the seat or retractable therefrom to, alternatively, block flow past the seat and permit such flow.

Such valves can be utilized to isolate portions of a fluid path, e.g. for emergency or control purposes, or simply to prevent flow along a particular portion of a fluid path.

More generally, such valves can be utilized in fluid circulation systems for isolating sections or portions thereof where required and/or to divert fluid flow along other portions of a circulating system or network.

Such valves may be stopcocks of the type in which the closure member is mounted on an end of a threaded rod which is rotated to axially displace this member, the rotation being effected either manually, e.g. via a handwheel, or by an electric motor whose shaft can be connected to the rod by suitable gearing.

For stopcocks adapted to operate at low pressures, the rod itself can be axially displaceable and can be driven by a diaphragm which is displaced by fluid pressure, i.e. the pressure of a control fluid applied to one side of the diaphragm.

In various applications, such isolating or blocking, valves must be remotely controlled. In the case of rotary valves, this remote control facility can be provided by energizing the motor from a remote location. In the case of fluid-actuated valves, the controlled fluid may be delivered to the working compartment of the valve as a result of a remote operation.

Such arrangements are utilized where the valve itself must be located, e.g. in the vicinity of a boiler, nuclear reactor core, pressure tank or other portion of a fluid system subjected to extreme thermal, radiation, pressure or other conditions.

A case in point is the control of fluid paths in nuclear reactors. In such installations, many isolating valves may be required in addition to the normal flow control valves in the cooling circuits for the nuclear reactors and for the fluid paths of other portions of nuclear electric-power generating stations.

Such isolating valves are required to close in the event of failure of a respective control valve to isolate the defective portion of the circuit and thereby avoiding evacuation of the latter and the serious consequences which venting, for example, can bring about.

In many cases, the controlled medium or fluid is radioactive or the isolating valve is located in a region of high radioactivity so that direct control of such valves is not possible and the remote control of the valves must be accomplished with the greatest of reliability.

While there are many valve systems available in the art, most of them are not effective in a fully reliable, remotely controlled application, especially for nuclear power plant use.

OBJECTS OF THE INVENTION

It is the principal object of my present invention to provide an improved isolating valve which avoids the drawbacks of earlier valve systems in the respects mentioned above.

Another object of this invention is to provide an improved valve system including a highly reliable, remotely operable valve which can be used effectively in nuclear power plant applications.

SUMMARY OF THE INVENTION

These objects and others which will become apparent hereinafter are attained, in accordance with the present invention in an isolating valve which comprises a valve body formed with a passage and with a seat communicating between opposite sides of this passage, a valve member juxtaposed with and shiftable toward and away from this seat on one end of a slidable rod whose opposite end is actuatable by a piston which is displaceable in a cylinder formed on the valve body. The cylinder defines with the piston a working chamber into which a control fluid under pressure can be fed. According to the invention, within the valve body I provide a tubular member or sleeve which is concentric or coaxial with the end of the rod carrying the valve member and of a length and cross section such that the interior of this sleeve is sealed off by the closure member in the open position of the valve.

The passage can be substantially straight, i.e. having its opposite sides extending parallel to one another, or can form a T, Y or L junction with the seat and actuator.

It has been found to be advantageous, in one embodiment of the invention, to provide a bellows around the rod carrying the closure member to isolate the portion of the housing through which the fluid circulates from the portion of the housing provided with the control system, i.e. from the rod and the seals which prevent fluid flow along the rod by the control fluid or the controlled fluid. The tubular member or sleeve, in this case, advantageously surrounds and encloses the bellows which can be affixed at one end to the valve member and at the opposite end to the sleeve or the housing in which the sleeve is anchored.

Preferably the sleeve is formed with an annular outwardly extending flange which is clamped between two housing parts, one formed with the seat while the other carries the cylinder, and which can be bolted together.

The use of the sleeve to protect the bellows has been found to be especially important when the fluid circulates under high pressure. The tubular member, moreover, provides a stop for the retracted valve closure member when the valve is open and limits stress upon the closure member or the rod under these conditions while also limiting the retraction stroke.

The sleeve, therefore, represents a significant contribution to the long life and reliability of the isolating valve and assures reproducible operations thereof.

The control piston-and-cylinder arrangement can be of the single-acting or double-acting type. For example, the control fluid may urge the valve member into its closed position and the controlled fluid pressure may urge the value member into its open position when the control pressure is relieved. Alternatively, control fluid may be introduced under pressure to alternate sides of the piston to open or close the valve selectively. If the effective piston surface area in the control cylindr is less than the effective surface area acting in the opposite direction of the valve member, the control fluid must be at a higher pressure than the controlled fluid. On the other hand, if the surface area of the control piston exceeds the surface area of the valve member, the fluid in the circuit in which the isolating valve is provided can be utilized to actuate the piston and open or close the valve.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
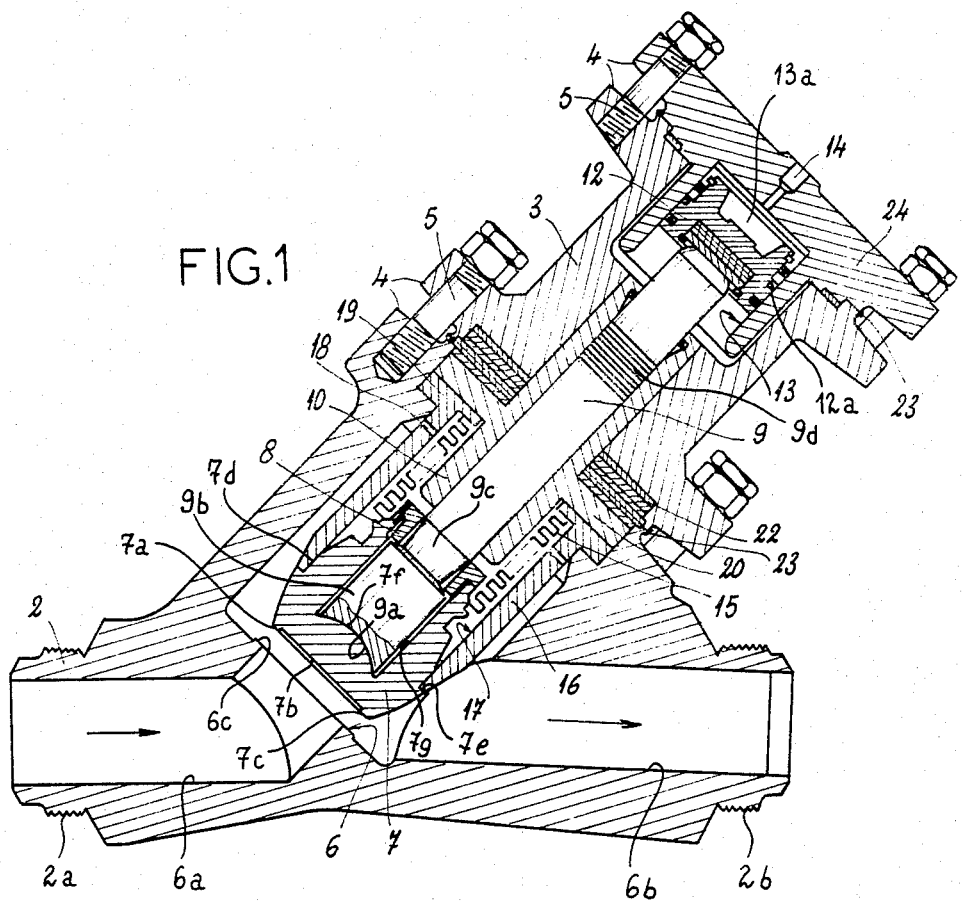
FIG. 1 is an axial cross-sectional view through an isolating valve in a first embodiment of the invention.
Figure 1A:
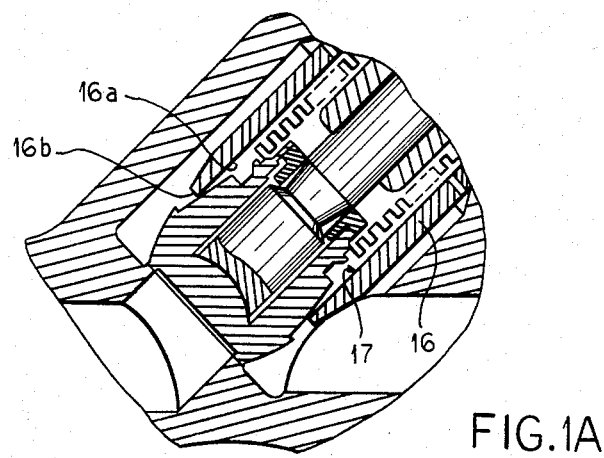
FIG. 1A is a diagrammatic cross section of a portion of this valve showing the valve member in its closed position.

The isolating valve shown in FIGS. 1 and 1A is of the Y-junction type comprising a two-part housing 2, 3 connected together by bolts 5 through flanges 4.

Part 2 of the housing forms a valve body which is provided with an annular seat 6 between two sides 6a and 6b of a flow passage which can be connected in the fluid circulation path via threaded fittings 2a and 2b at opposite axial ends of the housing part 2.

The seat 6 is juxtaposed with and engageable by a valve closure member 7. The latter has an end face 7a formed with a shallow recess 7b defining a rim 7c which is designed to abut against the raised rim 6c of the seat 6.

The valve member 7 is also formed with a cylindrical neck 7d extending away from the seat and terminating in a shoulder 7e.

This valve member 7 is secured by a clamping arrangement represented at 8, e.g. a self-centering nut assembly, on the free end of a rod 9. To allow a flat contact of the rim 7c with the rim 6c, the rod 9 can be formed with a bearing surface 9a which can have a spherical curvature complementary to the spherical curvature 7f of member 7, the end 9b of the rod being received with play within a cylindrical bore 7g of the valve member 7.

Upwardly of the end 9b, the rod is formed with a neck 9c in which the assembly 8 can engage so that, as the rod 9 advances toward the seat, the member 7 abuts the same in a flat contact before full pressure is applied to hold the valve member 7 in a sealing condition.

The rod 9 is guided in a sleeve 10 which is clamped by its flange 20 between the housing parts 3 and 4.

At the end of the rod 9 remote from the seat, the rod is connected to a piston 12 sliding in a cylinder 13 which can be supplied with control fluid under pressure through a port 14. The piston 12 is formed with piston rings 12a to prevent leakage therearound and the rod 9 can be provided with sealing rings or a sealing labyrinth 9d as well. The cylinder 13 can be formed on a cap 24 which is fitted into housing part 3 and secured thereto by other flanges 4 and bolts 5.

In this embodiment, the effective cross-sectional area of the piston 12 in the compartment 13a is less than the cross section of the valve member 7 so that, in order to close the valve, the control fluid must be supplied at a pressure substantially in excess of the fluid traversing the passages 6a, 6b.

The closure member 7 is sealed with respect to the housing by bellows 15 surrounding the rod 9 and clamped at one end between the flange 20 of sleeve 10 and a flange 19 of a tubular element 16 which coaxially surrounds the rod and the bellows to protect the latter.

The tubular element 16 has a length and cross section such that it is sealed when the closure member 7 is in its retracted position shown in FIG. 1.

To this end, the inner diameter of tubular member 16 at its lower extremity 16a can correspond to the outer diameter of the neck 7d while the free end 16b of the tubular element forms an abutment engageable with the shoulder 7e of the valve member.

Thus, when the valve member 7 is in its open or retracted position, the tubular element 16 forms a seat and abutment tightly receiving the closure member 7 and stabilizing it against movement or stress which can be generated by the controlled fluid.

In order to allow the shifting of the valve member 7 to its closed position (FIG. 1A), calibrated orifices 18 can be provided in the tubular element 16 to allow fluid to enter behind the valve member 7. The orifices 18 also permit reverse flow so that fluid can escape from within the element 16 upon retraction of valve member 7.

The flanges 19 and 20 form a stack of sealing elements with thermal insulating and pressure-sealing gaskets 22 to restrict heat transfer between the housing parts and form the housing parts to the actuating system and vice versa. The guide sleeve 10 is received within housing part 3 with a slight clearance to permit thermal expansion without interference with the operation of the valve and, particularly in radioactive applications, after the valve is assembled by the bolts as shown, sealing beads can be provided at 23 and 24 as further security measures.

Figure 3:
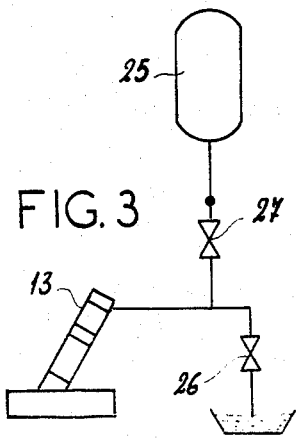
FIGS. 3 through 7 are flow diagrams showing the valve of FIG. 1 or FIG. 2 in various control modes.
Figure 4:
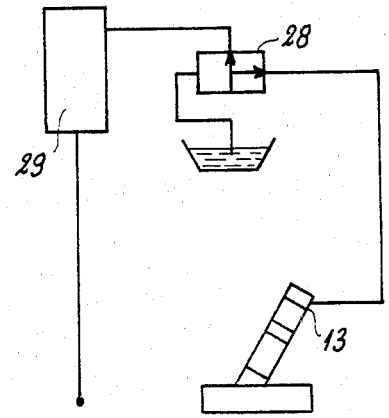

The valve of FIGS. 1 and 1A can operate in a variety of configurations more fully described with respect to FIGS. 3 and 4.

Figure 2A:
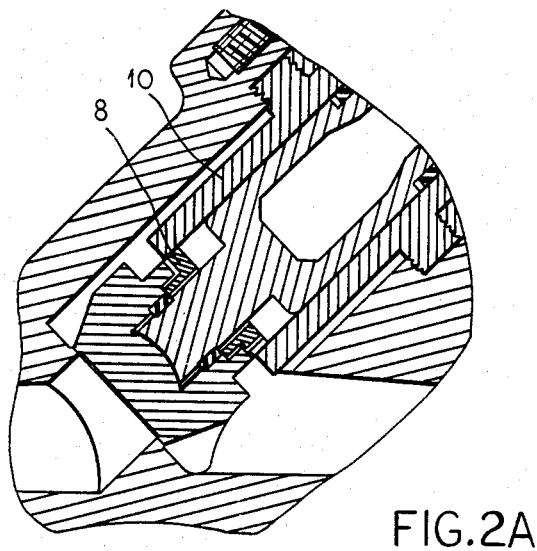
FIG. 2A shows, in a fragmentary section, the closed position of this latter valve.
Figure 2:
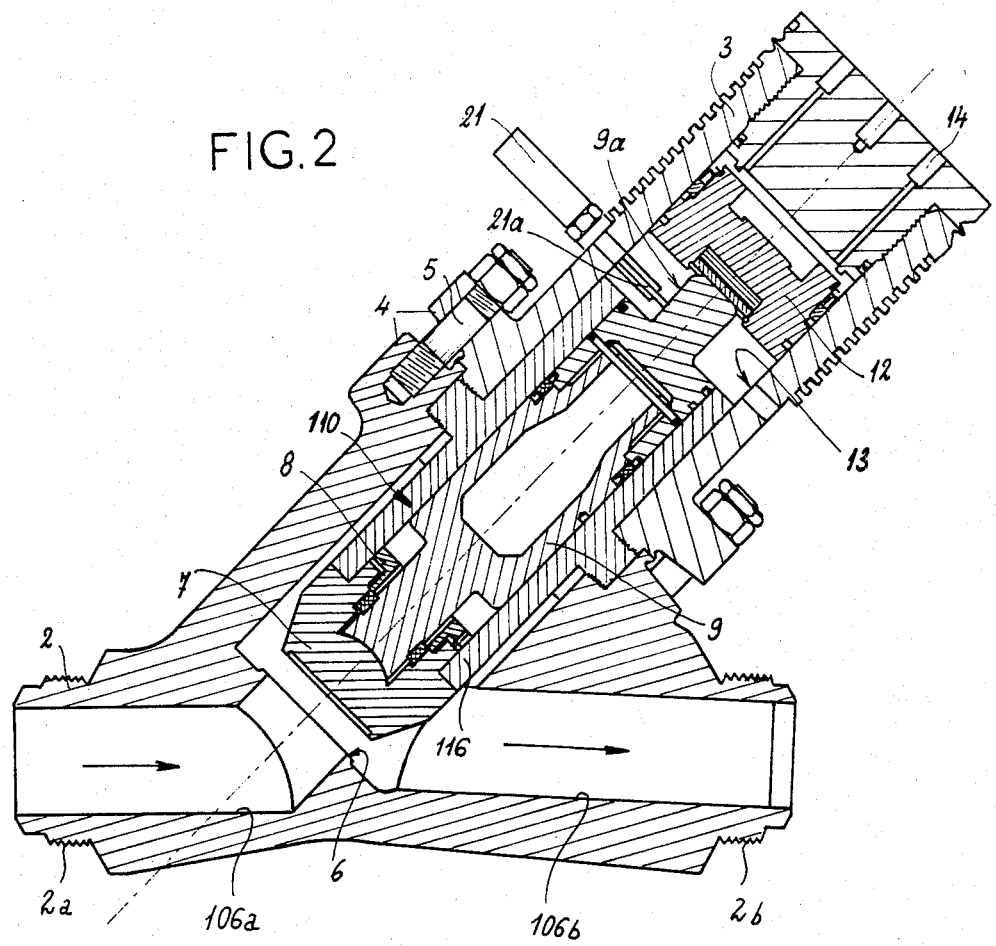
FIG. 2 is a view similar to FIG. 1 of a valve in a second embodiment of this invention.

FIGS. 2 and 2A show another embodiment of the invention in which structure equivalent to that of FIGS. 1 and 1A has been identified with similar reference numerals in the hundreds series. In this embodiments, however, the bellows is eliminated and the tubular member is formed as an extension 116 upon the guide sleeve 110 for the piston rod. In this case the control piston 112 can have a cross section which is greater than the cross section of the closure member 107 so that the control fluid may in part be bled from the passage 106a, 106b if desired.

Particularly for nuclear applications, a setting indicator 121 can have a finger 121a urged resiliently against an inclined ramp or cam surface 109a on the end of rod 109 proximal to the control piston. The displacement of this finger indicates the position of the valve and this information can be transmitted to a remote station by means known per se.

FIGS. 3 to 7 illustrate various methods of controlling this stopcock. In the embodiment shown in FIG. 3, the cylinder 13 is supplied from a tank 25 containing the fluid under pressure. An evacuation cock 26 is normally kept closed and the supply of fluid to the cylinder 13 is obtained by opening a gate 27 for a sufficient period.

Figure 5:
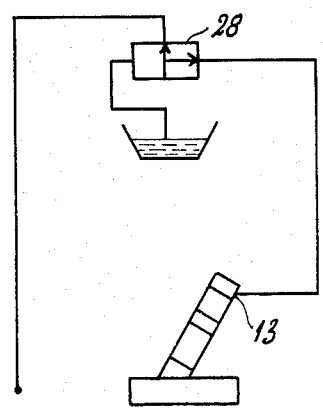

In the embodiment shown in FIGS. 4 and 5, the cylinder 13 is filled and emptied in controlled manner by actuating a three-way cock 28. In both cases, the fluid used to supply the cylinder 13 can be the fluid in the circuit on which the stopcock is mounted, provided the cross section of the piston 12 exceeds that of the closure member 7, as is the case in the stopcock of FIG. 2. The difference between the embodiments shown in FIGS. 4 and 5 resides in the fact that in the case of FIG. 4 control is realized through a detector 29.

Figure 6:
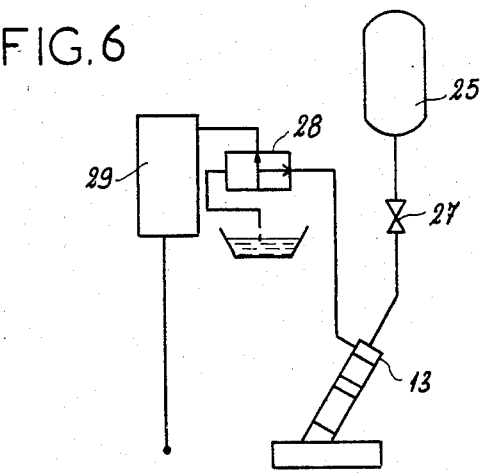
Figure 7:
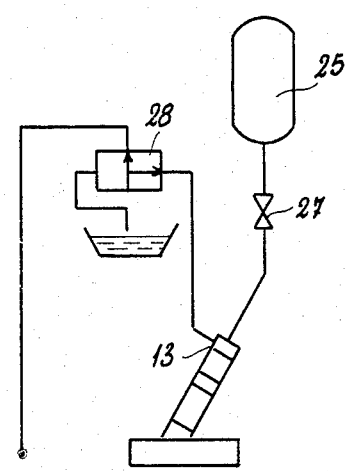

The embodiments shown in FIGS. 6 and 7 correspond to those shown in FIGS. 4 and 5 respectively, with the differences that not only is the supply taken from a primary source of fluid, such as the fluid in the circuit on which the stopcock is mounted, but also the supply is taken from the tank 25 which can be utilized if the fluid from the primary source has too low a pressure to actuate the stopcock.

I claim:

1. A high-pressure valve for isolating a portion of a fluid path, comprising:
    a two-part valve body formed in a first part with a passage connectable in said fluid path and provided between opposite sides of said passage with a valve seat, a bore defined by both parts of said body and aligned with said seat, and means for tightening said parts together;
    a guide sleeve received in said bore;
    a valve rod axially shiftable and guided in said sleeve for displacement toward and away from said seat;
    a valve member juxtaposed with and engageable with said seat at one end of said rod;
    a control piston in either one of said parts acting upon an opposite end of said rod and displaceable in a cylinder formed in said other part of said body said valve member having a cross section greater than the cross section of said rod;
    a bellows surrounding said rod and secured to said valve member at a face therof turned away from said seat at one end of said bellows while being retained fixedly with respect to said sleeve at another end of said bellows;
    a tubular element received in said body coaxially surrounding said body at least at an end thereof connected to said valve member and surrounding said bellows to form an abutment engaging said valve member in a retracted position thereof to stabilize same against forces applied to said valve member by fluid traversing said passage in said open position of said valve member wherein direct flow of fluid is permitted through said seat along said passage in said open position; and
    means including annular flanges braced against a stack of thermally insulating annular gaskets for sealing said parts of said body together and to said sleeve upon operation of said means for tightening while providing a thermal barrier along said sleeve.

2. The valve defined in claim 1 wherein said tubular element has an internal cross section corresponding to the external cross section of said valve member and sealingly engages same.

3. The valve defined in claim 2 wherein said tubular element is provided with one of said annular flanges, said parts being clamped together with said flange engaged between them.

4. The valve defined in claim 3, further comprising orifices in said tubular element communicating between the interior and exterior thereof.

5. The valve defined in claim 3 wherein said guide sleeve is provided with an outwardly extending flange axially abutting said flange of said tubular element.

6. The valve defined in claim 5 wherein said sleeve is received in said body with a slight clearance to permit expansion thereof.

* * * * *